2,905,532

METHOD OF REDUCING THE CAKING OF AMMONIUM SULPHATE CRYSTALS

Joshua Beaumont Thompson, Trail, British Columbia, Canada, assignor to The Consolidated Mining and Smelting Company of Canada Limited, Montreal, Quebec, Canada, a company incorporated in Canada No Drawing. Application January 28, 1955
Serial No. 484,855

Claim priority, application Canada June 24, 1954

5 Claims. (Cl. 23—119)

This invention relates to a method of producing ammonium sulphate and to ammonium sulphate crystals produced thereby.

Methods of producing ammonium sulphate are well known and are widely used, particularly for the production of ammonium sulphate for use as a chemical fertilizer. Also, it is well known that ammonium sulphate crystals tend to form cakes of varying sizes and hardness. This tendency is particularly noticeable when ammonium sulphate crystals are exposed to variations in temperature and humidity conditions during storage and is especially aggravated during periods or in areas of relatively low humidity.

The caking characteristic of ammonium sulphate crystals presents an important problem in the manufacture and sale of ammonium sulphate for use as a commercial fertilizer in that it cannot be applied to the soil by conventional chemical fertilizer distributing devices after a period in storage without prior crushing or grinding. Various anti-caking and addition agents have been proposed to alter the structure of the ammonium sulphate crystals or to coat them, and thus restrict the tendency to cake, but these agents have met with only limited success.

I have found that the problem of caking associated with storing ammonium sulphate can be overcome by treating the ammonium sulphate crystals with an anionic synthetic detergent, such as an alkyl aryl sulphonate. The resulting ammonium sulphate product is free-flowing and retains its non-caking properties through long periods of storage.

The term "anionic synthetic detergents" employed herein is intended to include detergent compounds such as, but not necessarily limited to, members of the group of alkyl aryl sulphonate compounds, such as alkyl aryl sodium sulphonate and like detergent compounds having similar physical and/or chemical characteristics.

The detergent can be mixed with the ammonium sulphate crystals in a number of ways. Ammonium sulphate fertilizer is usually produced by crystallization from ammonium sulphate solution followed by separation of the crystals from "mother liquor," for example, in a centrifuge, followed by drying the crystals prior to storage. The detergent can be sprayed as a solution on the crystals as they are discharged from the centrifuge or on the crystals in the drier, or dry detergent can be mixed with the crystals in the drier or in a separate mixer before or after drying.

The method of the present invention has been employed with important advantages in the treatment of ammonium sulphate fertilizer produced from ammonium sulphate solutions prepared by acidifying with sulphuric acid solutions of ammonium sulphite used as the absorbent for sulphur dioxide contained in smelter gases. The sulphate solution so prepared was evaporated in a crystallizer to form a magma or slurry of ammonium sulphate crystals in a concentrated ammonium sulphate solution. The crystals were separated from the concentrated ammonium sulphate solution in a centrifuge and washed. The moist crystals were sprayed with an aqueous solution which contained a synthetic anionic detergent in which the active ingredient was an alkyl aryl sodium sulphonate. The concentration of active ingredient in the detergent solution is not critical and may be varied within a relatively wide range depending on the amount of active ingredient to be applied to the ammonium sulphate crystals, the ease of application and the evaporating capacity of the drier handling the treated salt. With concentrations below about 10 grams per liter of active ingredient the solution is too dilute and necessitates excessive evaporation when drying the salt. With concentrations above about 100 grams per liter of active ingredient, the solution becomes too concentrated and solidification may occur. It is preferred, therefore, to employ a detergent solution which contains from about 10 to about 100 grams per liter of active ingredient and, preferably, about 55 grams per liter. The detergent solution was heated to a temperature sufficiently high to prevent solidification of the solution in the conduits, for example, of the order of about 40° C. Treated ammonium sulphate crystals were discharged onto a conveyor belt which fed them to a rotary drier wherein the crystals and the detergent were thoroughly mixed and the salt was dried to commercial grade dryness.

I have found further that synthetic detergents which substantially reduce the tendency of ammonium sulphate crystals to cake and harden during storage are those which contain an alkyl aryl sodium sulphonate wherein the alkyl group contains from 6 to 18 carbon atoms, preferably a propylene tetramer, and the aryl group is a benzene ring. Commercial detergents which have been employed with advantage in the method of the present invention and in which the surface active agent is an alkyl aryl sodium sulphonate are sold under the trade names "Oronite," "Santomerse No. 1," "Orvus Neutral Granules," "Surf," "Kreelon 8G." The use of these detergents produces very satisfactory results in the operation of the present method.

It has been found that application of the surface active ingredient of the synthetic detergent in amount of from about 0.005% to about 0.05%, preferably about 0.02%, by weight, of the ammonium sulphate, greatly reduces the tendency of the ammonium sulphate crystals to cake or set. Amounts greater than about 0.05% can be used but are not required and the use of excess quantities is not economic. Also, dilution below the required grade of 21.0% nitrogen in the ammonium sulphate fertilizer is, of course, undesirable.

The following examples illustrate the improved non-caking characteristic of ammonium sulphate crystals treated with a synthetic anionic detergent according to the method of the present invention. A number of 100 pound bags of treated ammonium sulphate fertilizer and an equal number of 100 pound bags of untreated ammonium sulphate fertilizer were stored under shelter in each of different areas of low, moderate and relatively high humidity. The synthetic detergents were applied to the treated ammonium sulphate crystals in amount sufficient to provide about 0.02%, by weight of the active ingredient based on the ammonium sulphate.

After a storage period of about eight months, each bag was opened and the contents were examined to determine the amount of caking which had occurred. It was found that in all three areas the tendency towards caking of the detergent-conditioned ammonium sulphate was substantially less than that of the unconditioned sulphate.

General observations indicated that the detergent-conditioned fertilizer in each of the three areas was in excellent, free-flowing condition and the small amount of cake which was formed was easily hand-friable, but the unconditioned fertilizer had formed cakes which were so hard and dense that mechanical crushing was required to make the unconditioned fertilizer suitable for use.

The following table provides a comparison of the results obtained with treated and untreated ammonium sulphate, using an arbitrary base of 100 to express the caking tendency under the most severe conditions, that is, untreated crystals in an area of low humidity.

| Humidity | Unconditioned Ammonium Sulphate | Detergent-Conditioned Ammonium Sulphate |
|---|---|---|
| Low | 100 | 30 |
| Moderate | 68 | 0.7 |
| High | 32 | 19 |

The method of the present invention possesses a number of important advantages. Primarily it provides a solution to the problem of caking and setting of ammonium sulphate crystals during storage. Also, the treatment does not add materially to the cost of production in that the cost of the detergent is relatively low and only a small amount, of the order of about 0.4 pounds of active ingredient, is employed per ton of ammonium sulphate produced. Also, of course, the detergent can be applied to or mixed with the ammonium sulphate crystals by readily available, conventional spraying or mixing devices.

It will be understood, of course, that modifications can be made in the preferred embodiment of the invention described herein without departing from the scope of the invention as defined by the appended claims.

What I claim as new and desire to protect by Letters Patent of the United States is:

1. The method of treating ammonium sulphate crystals with from about 0.005% to about 0.05% by weight of an alkyl aryl sodium sulphonate.
2. The method of reducing the caking characteristics of ammonium sulphate crystals during storage which comprises treating the crystals prior to storage with an alkyl aryl sodium sulphonate in amount within the range of from about 0.005% to about 0.05% by weight of the ammonium sulphate crystals.
3. In a process for the production of ammonium sulphate in which ammonium sulphite solution used for the absorption of sulphur dioxide from combustion gas is acidified with sulphuric acid to form ammonium sulphate solution, ammonium sulphate solution is evaporated to produce a suspension of ammonium sulphate crystals in ammonium sulphate solution and ammonium sulphate crystals are separated from the ammonium sulphate solution, the improvement which comprises spraying the ammonium sulphate crystals with a solution which contains an alkyl aryl sodium sulphonate in amount sufficient to provide from about 0.005% to about 0.05% of an alkyl aryl sodium sulphonate by weight of the ammonium sulphate crystals and thereafter drying the ammonium sulphate crystals treated with an alkyl aryl sodium sulphonate.
4. Ammonium sulphate crystals treated with from about 0.005% to about 0.05% by weight of an alkyl aryl sodium sulphonate in which the alkyl group is a propylene tetramer and the aryl group is benzene.
5. The method of treating ammonium sulphate crystals with from about 0.005% to about 0.05% by weight of an alkyl aryl sodium sulphonate in which the alkyl group is a propylene tetramer and the aryl group is benzene.

References Cited in the file of this patent
UNITED STATES PATENTS

| | | |
|---|---|---|
| 1,932,434 | Wyler | Oct. 31, 1933 |
| 2,021,558 | Lee et al. | Nov. 19, 1935 |
| 2,257,545 | Curtis | Sept. 30, 1941 |
| 2,287,864 | Burton et al. | June 30, 1942 |
| 2,631,980 | Lewis | Mar. 17, 1953 |
| 2,717,243 | Block et al. | Sept. 6, 1955 |
| 2,797,982 | McKinney | July 2, 1957 |